United States Patent
Frazer

(10) Patent No.: US 7,952,387 B1
(45) Date of Patent: May 31, 2011

(54) SECURING MEMORY BASED IP IN FPGAS

(75) Inventor: Rodney Frazer, Dacula, GA (US)

(73) Assignee: Altera Corporation, San Jose, CA (US)

( * ) Notice: Subject to any disclaimer, the term of this patent is extended or adjusted under 35 U.S.C. 154(b) by 249 days.

(21) Appl. No.: 12/234,198

(22) Filed: Sep. 19, 2008

Related U.S. Application Data

(63) Continuation of application No. 12/190,827, filed on Aug. 13, 2008, now abandoned.

(51) Int. Cl.
*H03K 19/173* (2006.01)
*G06F 11/30* (2006.01)
*G06F 12/14* (2006.01)
*G06F 17/50* (2006.01)

(52) U.S. Cl. .................... 326/38; 713/190; 716/117
(58) Field of Classification Search .............. 326/37–41, 326/47; 716/8, 16; 726/26
See application file for complete search history.

(56) References Cited

U.S. PATENT DOCUMENTS

| | | | | |
|---|---|---|---|---|
| 6,078,735 | A * | 6/2000 | Baxter | 716/117 |
| 7,162,644 | B1 * | 1/2007 | Trimberger | 713/189 |
| 7,725,738 | B1 * | 5/2010 | Langhammer et al. | 713/191 |
| 2001/0032318 | A1 * | 10/2001 | Yip et al. | 713/190 |
| 2005/0093572 | A1 * | 5/2005 | Sun et al. | 326/38 |
| 2009/0058462 | A1 * | 3/2009 | Mason et al. | 326/38 |

\* cited by examiner

*Primary Examiner* — Vibol Tan
*Assistant Examiner* — Dylan White
(74) *Attorney, Agent, or Firm* — Martine Penilla & Gencarella, LLP

(57) ABSTRACT

A memory initialization file and one or more design files associated with configuring an IC are identified. The memory initialization file is encrypted using one or more encryption algorithms. A configuration bit stream is generated by compiling and assembling the encrypted memory initialization file and the one or more design files. During the programming phase, the configuration bit stream is received at the IC, decoded and logic design and content of encrypted memory initialization file are loaded into the respective logic elements and memory arrays of the IC. The IC then transitions into a user phase where the contents of the encrypted memory initialization file in the memory arrays are decrypted and validated at the on-chip memory within the IC to ensure that the integrity of the content is maintained. Upon successful verification of the integrity of the content, the content within the on-chip memory is available for processing.

22 Claims, 9 Drawing Sheets

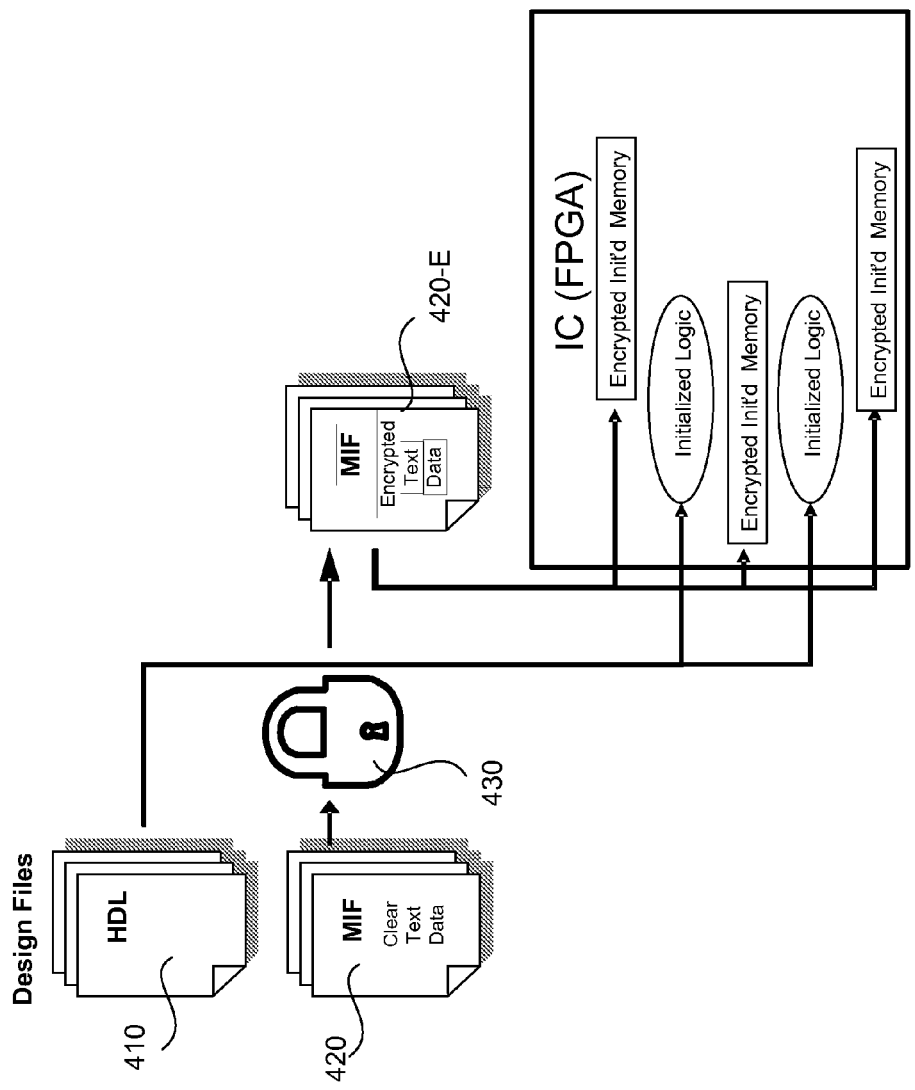

SECURING MEMORY BASED IP IN FPGAS

CROSS REFERENCE TO RELATED APPLICATIONS

This application is a continuation of U.S. patent application Ser. No. 12/190,827, entitled "SECURING MEMORY BASED IP IN FPGAs", filed on Aug. 13, 2008 now abandoned, listing Rodney Frazer as inventor, which is incorporated herein by reference in its entirety.

BACKGROUND OF THE INVENTION

Complex and valuable digital system designs are implemented in integrated circuits chips (ICs). These ICs include application specific integrated circuits (ASICs) and programmable logic devices (PLDs), such as Field Programmable Gate Arrays (FPGAs). PLDs are becoming more prevalent than their counter-part high-end ASICs, as they provide a more cost-effective user-customizable device design. However, the method for operating these ICs (PLDs) results in compromising the valuable proprietary (intellectual property or IP) information associated with the design of the IC. This is due to the fact that the on-chip memory of the IC is usually random access memory based (RAM-based). The RAM-based on-chip memory content of the IC is volatile and is wiped out every time the IC is powered down. As a result, every time the IC is powered back on, the design data is read-in to the IC in the form of configuration bit stream. The configuration bit stream is used to initialize and configure the IC during an initial programming phase. The configuration bit stream includes memory initialization data placed at predictable locations within the bit stream. This configuration bit stream can be easily duplicated (cloned) or reverse-engineered during the read-in phase or the programming phase of the IC.

The configuration bit-stream containing the design data of the IC, including the memory initialization data, is exposed at a board level on which the IC is embedded, for potential duplication during the programming of the IC. Transferring of the configuration bit stream from an accompanying on-board memory to the IC can lead to acquiring the design data of the IP and eventually cloning the design. As the configuration bit streams hold memory initialization data in predictable locations, the design data can be acquired by extracting bit streams from these predictable locations. A competitor may perform silicon reverse-engineering using the duplicated configuration bit stream to learn and improve on the IP.

It is in this context that embodiments of the invention arise.

BRIEF SUMMARY OF THE INVENTION

Broadly speaking, the present invention fills these needs by providing methods and system for securing data within a memory (on-chip memory) of an integrated circuit (IC) chip. The data within the on-chip memory of the IC may include intellectual property (IP) information including actual configuration information of the IC. The initialization data patterns for a given IC, such as programmable logic device, place the memory initialization data (initialization data) in predictable locations within the overall IC configuration data stream. As a result, cloning and reverse-engineering is easier. To overcome cloning and reverse-engineering problems associated with the configuration information, a tamper-proof method is provided to protect the memory initialization data of the configuration bit stream thereby preserving the IP information associated with the design of the IC.

A memory initialization file (MIF) associated with the initialization and configuration of the IC is encrypted using any one or combination of encryption algorithms. The encryption is done prior to assembling the MIF content into a configuration bit stream. The memory initialization file includes data patterns for initializing an on-chip memory of the IC. The encrypted MIF along with Hardware Description Language (HDL) files and other design specific files are assembled into a configuration bit stream using a software development tool. The configuration bit stream is then stored along with other configuration files in a configuration bit stream (CBS) file repository. The configuration bit stream is also programmed into a configuration device with a non-volatile memory, such as a non-volatile Random Access Memory device (NVRAM) or non-volatile Flash device (NV-Flash). During the configuration phase of an IC, such as a FPGA, the configuration bit stream is loaded onto the IC. Upon loading, the configuration bit stream is decoded and the contents loaded onto logic elements and memory arrays at the respective on-chip memory of the IC. The encrypted content within the memory arrays are decrypted and validated. Upon successful decryption and validation, the content in the on-chip memory is ready for use by a CPU or any other processor device within or outside the IC.

Towards this end, in one embodiment, a method for protecting contents in an on-chip memory of an integrated circuit chip includes encrypting a memory initialization file wherein the memory initialization file includes data patterns that are used to initialize memory arrays of an on-chip memory and configure an IC. The encryption of memory initialization file may be performed using any type of encryption algorithm. The encrypted memory initialization file is assembled along with HDL and other configuration specific files into a configuration bit stream. The configuration bit stream is stored in a configuration device with a non-volatile memory, such as a NVRAM, external to the IC. The IC includes a volatile memory having configuration information. The content of the volatile memory within the IC is lost every time the IC is powered down. To configure the IC, the configuration bit stream is read-in to the IC during a programming phase when the IC is powered up. The configuration bit stream is decoded and loaded onto appropriate logic elements and memory arrays at the IC. The content in the memory arrays are decrypted and verified to ensure integrity of the content. Upon successful verification of the integrity of the content, the content of the on-chip memory is ready for use by a processor within or external to the IC.

In another embodiment, a system is provided for protecting data within an on-chip memory of an integrated circuit (IC) device. The system includes a PC or workstation equipped with a software program to identify a memory initialization file (MIF) associated with initializing an on-chip memory of the IC. The identified MIF is encrypted to mask the contents contained therein. The software program is configured to use any one or combination of encryption algorithms to encrypt the identified MIF. The encrypted MIF is forwarded to a development tool within the PC or workstation. The development tool assembles a configuration bit stream using the encrypted MIF and one or more design files, such as HDL, verilog, etc., and other configuration related files. The system includes a storage repository in which the assembled configuration bit stream is stored. The system also includes a configuration device with a non-volatile memory external to the IC, such as a NVRAM, into which the assembled configuration bit stream is loaded. The configuration device is used in downloading the configuration bit stream into the IC device during configuration phase of the IC. The configuration bit stream is decoded and used to initialize respective logic elements and memory arrays within an on-chip memory in the IC. Upon successful loading, content in the memory arrays are decrypted and validated. A decryption and validation block (DVB) within the IC includes a decryption logic and a validation logic to decrypt and validate the encrypted memory content within the memory arrays at the on-chip memory of the IC. Upon successful validation, a processor within or external to the IC uses the validated content from the on-chip memory for processing. The on-chip memory, processor and the DVB within the IC are communicatively connected through a data bus so that the decryption, validation and initialization at the IC can be carried out.

In yet another embodiment, a method for protecting contents in an on-chip memory of an integrated circuit chip includes encrypting a memory initialization file using any type of encryption algorithm. The encrypted memory initialization file is assembled along with HDL and other configuration specific files into a configuration bit stream. The configuration bit stream is further encrypted using one or more encryption algorithms that is distinct from the encryption algorithm used in encrypting the memory initialization file and the encrypted configuration bit stream is programmed into a configuration device with a non-volatile memory, such as a NVRAM, external to the IC. The encrypted configuration bit stream is read-in to the IC during a programming (configuration) phase when the IC is powered up. The encrypted configuration bit stream is decrypted, decoded and the content loaded onto appropriate logic elements and memory arrays at the IC. The content within the memory arrays includes encrypted memory initialization file information. The memory array content are decrypted and verified to ensure integrity of the content. Upon successful verification of the integrity of the content, the content of the on-chip memory is ready for use by a processor within or external to the IC.

Other aspects and advantages of the invention will become more apparent from the following detailed description, taken in conjunction with the accompanying drawings, illustrating by way of example the present invention.

BRIEF DESCRIPTION OF THE DRAWINGS

The present invention will be readily understood by the following detailed description in conjunction with the accompanying drawings, and like reference numerals designate like structural elements.

FIG. 5A illustrates a simplified configuration mapping of design and memory initialization files in the IC based on the design flow of FIG. 5, in one embodiment of the invention.

DETAILED DESCRIPTION

Figure 1:
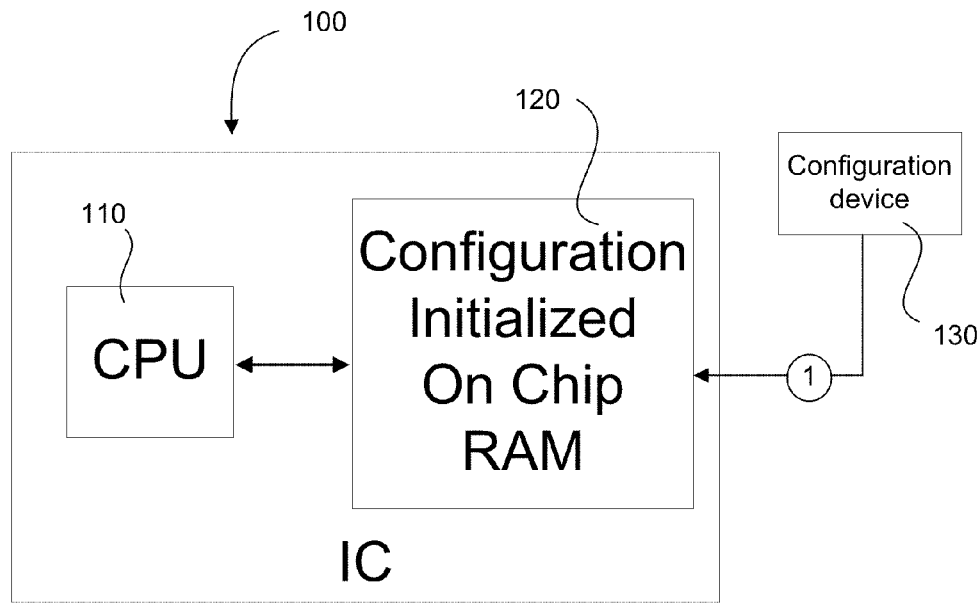
FIG. 1 illustrates a simplified block diagram of processor (CPU) instantiated inside an IC that runs initialized code from an on-chip memory that is vulnerable to tampering and cloning, in one embodiment of the invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The embodiments of the invention include a method for securing memory based IP in an integrated circuit (IC), such as a Field Programmable Gate Array (FPGA), by identifying and encrypting appropriate memory initialization files associated with the design of the integrated circuit. The encrypted memory initialization file is assembled along with other design files into a configuration bit stream. The configuration bit stream is stored in a configuration device with a non-volatile memory. The configuration device encompasses devices such as non-volatile random access memory (NVRAM), non-volatile Flash memory, etc. The IC, such as a programmable logic device (PLD), includes a volatile on-chip memory, such as a random access memory (RAM). The volatile on-chip memory of the IC loses its contents every time the IC is powered down. Hence, during a programming or configuration phase of the IC, the assembled configuration bit stream, with the design information of the IC, is transmitted from the configuration device to the on-chip memory of the IC device.

Once inside the IC device, the configuration bit stream is decoded and appropriate portions of the memory initialization file are loaded into corresponding logic elements and memory arrays within the on-chip memory. The programming phase of the IC may be during the power-on stage of the IC device. Once the memory initialization file is loaded onto the on-chip memory of the IC, the IC transitions from configuration mode into user mode. It should be noted that the words 'mode' and 'phase' are used interchangeably in this application to define a current processing stage of the IC. In the user mode, a decryption and validation block (DVB) within the IC is used to decrypt and validate the memory contents within the memory arrays of the on-chip memory. Upon successful validation, the contents within the on-chip memory, including data and code, are made available to a processor or other processing device within or outside the IC for processing.

The embodiments, thus, provide a way to secure the memory initialization data within the configuration bit stream. The embodiments of the invention ensure safe transmission of memory initialization file into the IC and secure initialization of the memory content within the on-chip memory thereby making cloning or tampering of the memory initialization file difficult. The encryption algorithms used in encrypting the memory initialization data may be any one or combination of encryption algorithms that are available and are not restricted to any specific single algorithm. A decryption and validation block within the IC decrypts and validates the encrypted memory initialization data within the memory arrays of the on-chip memory, when the IC enters a user mode. The DVB uses a decryption algorithm corresponding to the encryption algorithm used in encrypting the memory initialization file. Enabling decryption of memory contents outside of configuration mode further deters tampering or cloning of the memory contents that are common during the configuration mode.

The IC may be assembled on a board on which plurality of components are assembled. The plurality of components onboard includes a configuration device block with a non-volatile memory, external to the IC, in which a configuration bit stream associated with the IC may be stored. The configuration bit stream includes one or more design files and a memory initialization file (MIF) associated with the IC. The MIF is encrypted before being assembled into the configuration bit stream. The encryption of the memory initialization data before assembling a configuration bit stream makes identification and duplication of the memory initialization data within the configuration bit stream much more unpredictable and difficult. The embodiments of the invention may further be used to effectively secure data that is already encrypted. In one embodiment, a development tool available at a PC or workstation encrypts the configuration bit stream, which includes encrypted memory initialization file (MIF) and other design files, such as HDL, verilog, etc., associated with the IC. The encrypted MIF undergoes further encryption during encryption of the configuration bit stream. By encrypting an already encrypted data, pattern predictability and cracking of the code is made more difficult.

With the above overview of the invention in mind, the details of the embodiments will now be described with reference to the various drawings. FIG. 1 illustrates a simplified block diagram of an integrated circuit (IC) design wherein the content of an on-chip memory is vulnerable to tampering and/or cloning. The IC 100 includes, among other things, a processor (CPU) 110 to use initialized memory contents stored within an on-chip memory 120 of the IC 100. The on-chip memory 120, such as a random access memory (RAM), is a volatile memory. A configuration device 130 with a non-volatile memory external to the IC 100 is used to store configuration bit stream defining the design of the IC 100. The configuration bit stream includes design files, such as hardware definition language files (HDL), verilog files, etc., and memory initialization files with data patterns placed at predictable locations. As a result, during a programming phase associated with a powering up of the IC, as the configuration bit stream is read-in from the configuration device into the on-chip memory 120 of the IC 100, the configuration bit stream is exposed to the external elements, as illustrated by bubble 1, enabling snooping, cloning and tampering. To avoid exposure of the memory initialization contents in the configuration bit stream to external elements, the contents of the MIF needs to be secured.

Figure 2:
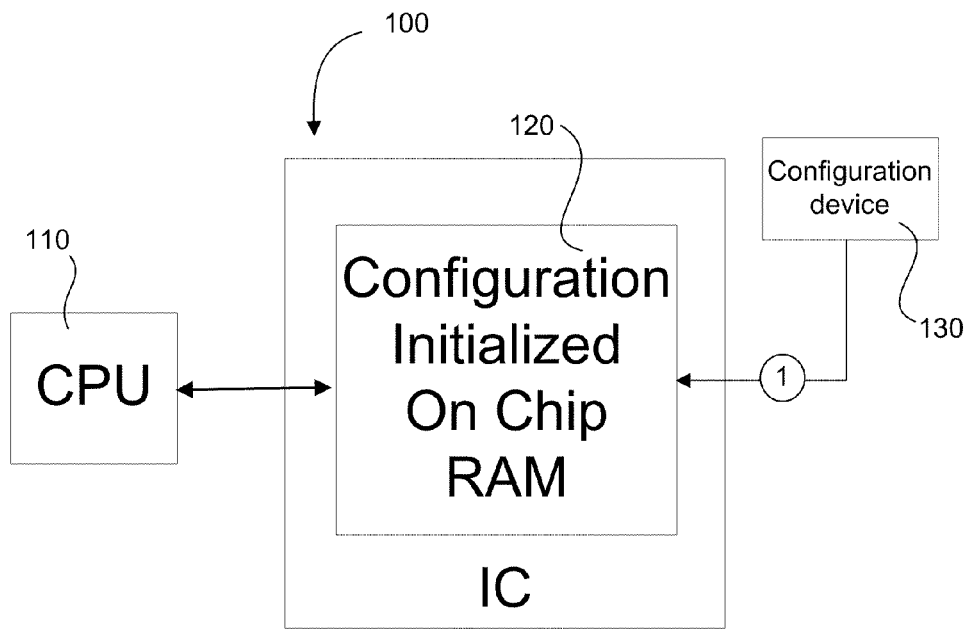
FIG. 2 illustrates a simplified block diagram of a CPU instantiated external to the IC that runs initialized code from an on-chip memory within the IC that is vulnerable to tampering and cloning, in an alternate embodiment of the invention.

FIG. 2 is an alternate embodiment of an IC design discussed with respect to FIG. 1 that is vulnerable to tampering and snooping. In this embodiment, a processor (central processing unit or CPU) 110 external to the IC 100 is used to access contents within an on-chip memory 120 of the IC 100. The on-chip memory 120 of the IC 100 is a volatile memory, such as a RAM. A configuration device 130 with a non-volatile memory external to the IC 100 is used to store a configuration bit stream within which memory initialization data for the on-chip memory 120 of the IC 100 is assembled along with other design data files. The configuration bit stream provides the design information to initialize the on-chip memory content and to configure the IC 100. In this embodiment, the processor 110 is communicatively connected to the on-chip memory 120 of the IC 100 and the on-chip memory 120 of the IC 100, in turn, is communicatively connected to the external configuration device 130 through respective data buses. During a power-on programming (configuration) phase of the IC, the configuration bit stream is transmitted from the configuration device 130 to the IC 100. In this embodiment, the configuration bit stream is vulnerable to snooping and tampering during transmission from the configuration device 130 to the on-chip memory 120, as illustrated by bubble 1, and during initialization of the memory contents in the IC 100. It is, therefore, crucial to find ways to secure the memory initialization data within the configuration bit stream so that even if the configuration bit stream is tampered it will be difficult to determine the location of the data patterns associated with the memory initialization file.

Figure 3:
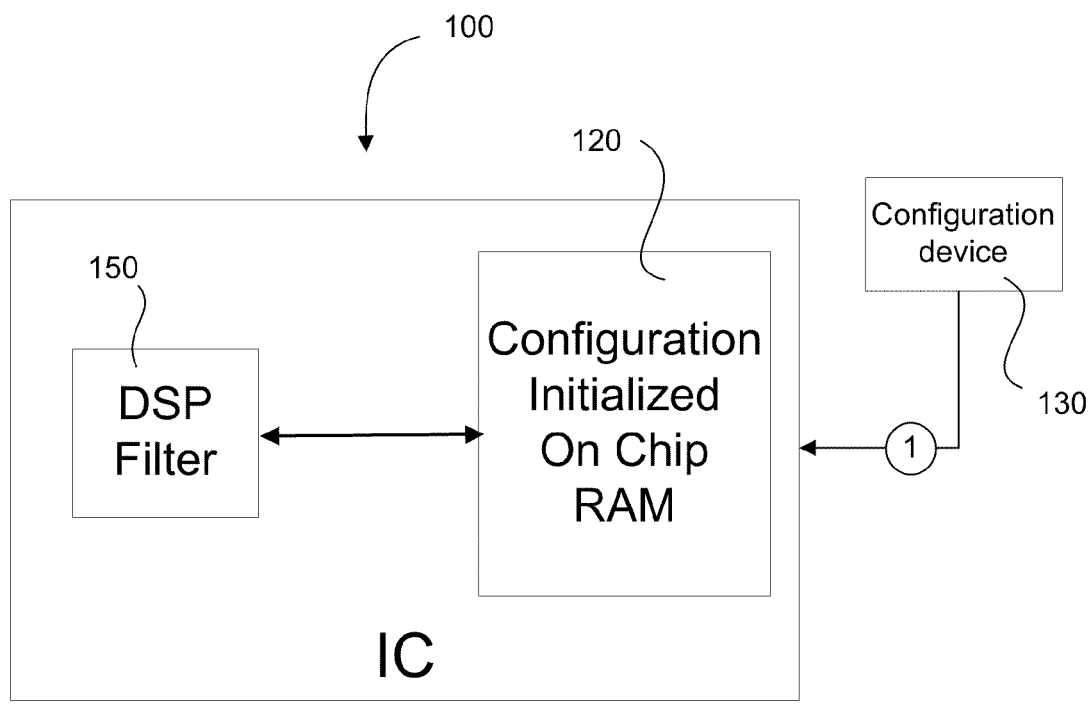
FIG. 3 illustrates a simplified block diagram of a DSP filter instantiated inside an IC that relies on initialized memory based coefficients from an on-chip memory that is vulnerable to tampering and cloning, in an embodiment of the invention.

FIG. 3 illustrates an alternate embodiment of an IC design that is vulnerable to tampering and snooping. In this embodiment, the IC 100 includes an on-chip memory 120, such as RAM, to hold initialization and other data associated with the IC 100. The IC 100 also includes a DSP filter 150 that relies on filter coefficients available at the on-chip memory to process digital signals at the IC 100. These on-chip memory based filter coefficients are initialized by a configuration bit stream. As mentioned earlier, the configuration bit stream is assembled using memory initialization data associated with the IC 100 and is stored in a configuration device 130 with non-volatile memory external to the IC 100. The on-chip memory 120 of the IC 100 is communicatively connected to the configuration device 130 by a data bus and is configured to receive the configuration bit stream with the memory initialization data from the configuration device 130. The DSP filter 150 is, in turn, communicatively connected to the on-chip memory by a corresponding data bus in order to access the filter coefficients contained therein for processing the digital signals at the IC 100. The configuration bit stream from the configuration device 130 is vulnerable to snooping during transmission to the on-chip memory 120 of the IC 100, as illustrated by bubble 1. It is, therefore, beneficial to secure the configuration bit stream so that the memory initialization data contained therein is prevented from being tampered or cloned.

Figure 4:
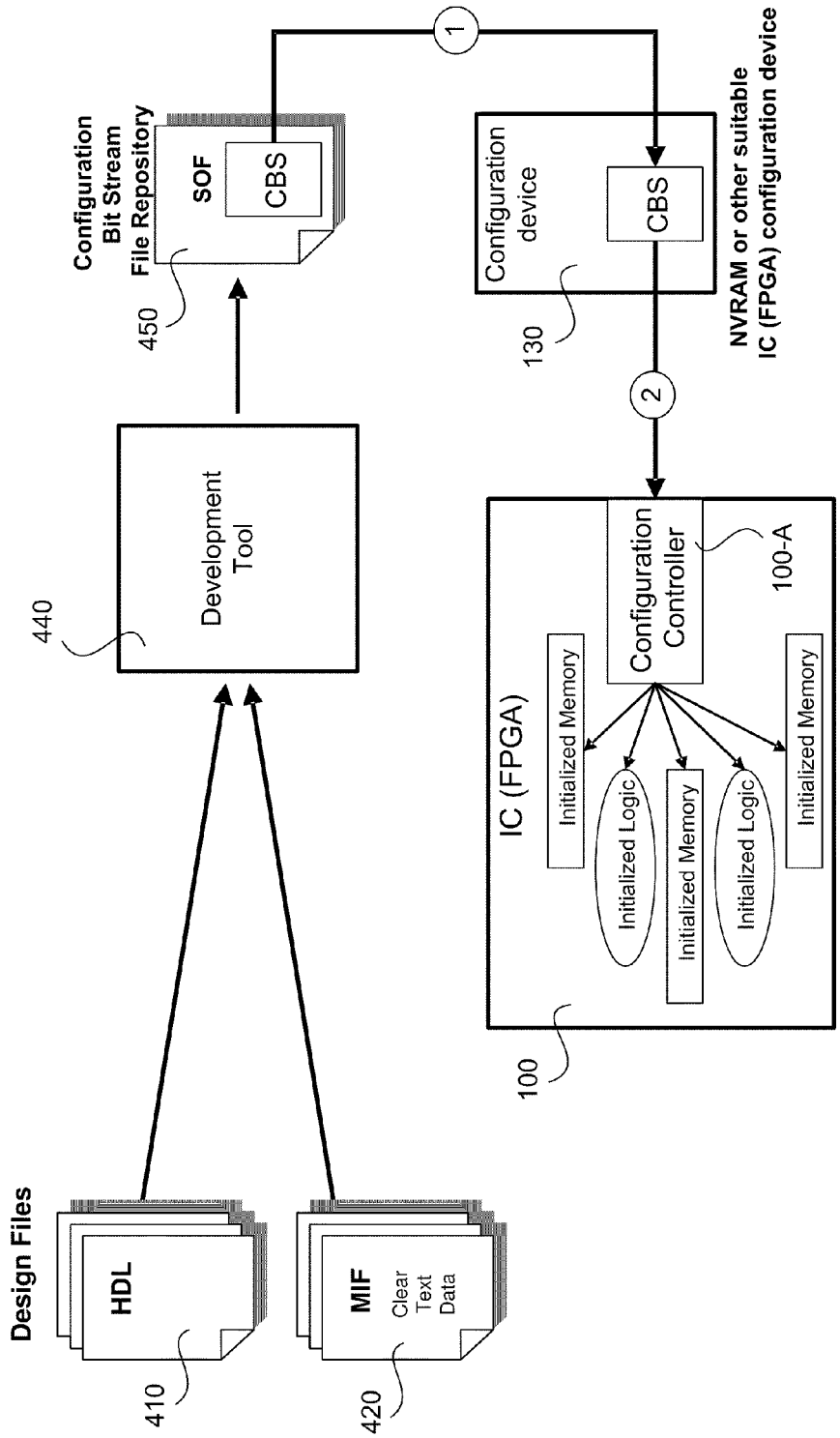
FIG. 4 illustrates a simple standard design flow of an unencrypted bit stream for configuring the IC.

FIG. 4 illustrates a simple standard design flow of unencrypted configuration bit stream that is prone to cloning or tampering. The configuration bit stream includes design information for an IC 100. The IC design starts with the identification of one or more design files (hardware description language files (HDLs)) 410 defining the logic operation required as well as one or more memory initialization files (MIFs) 420 for initializing on chip memories within the IC. A software program within a PC or workstation is used in the identification of the design and initialization files. The identified design and memory initialization files are forwarded to a development tool 440 available to the PC or workstation. The development tool 440 within the PC or workstation is a software program, such as QUARTUS II™ or any other electronic design automation (EDA) software, that compiles the HDL design files and MIF files and generates a configuration bit stream (CBS). The generated CBS is stored in a configuration bit stream file repository 450. The CBS is programmed into a configuration device with a non-volatile memory associated with the IC 100. The configuration device 130 may encompass a non-volatile random access memory (NVRAM) device or non-volatile Flash device (NVFlash). The configuration device mentioned herein is to be considered exemplary and not restrictive. During the design phase of the IC 100, the configuration device communicates with the IC 100 and transmits the CBS contained therein to a configuration controller 100-A in the IC 100. The configuration controller 100-A loads the user design into one or more logic elements and memory arrays in an on-chip memory of the IC 100.

Figure 4A:
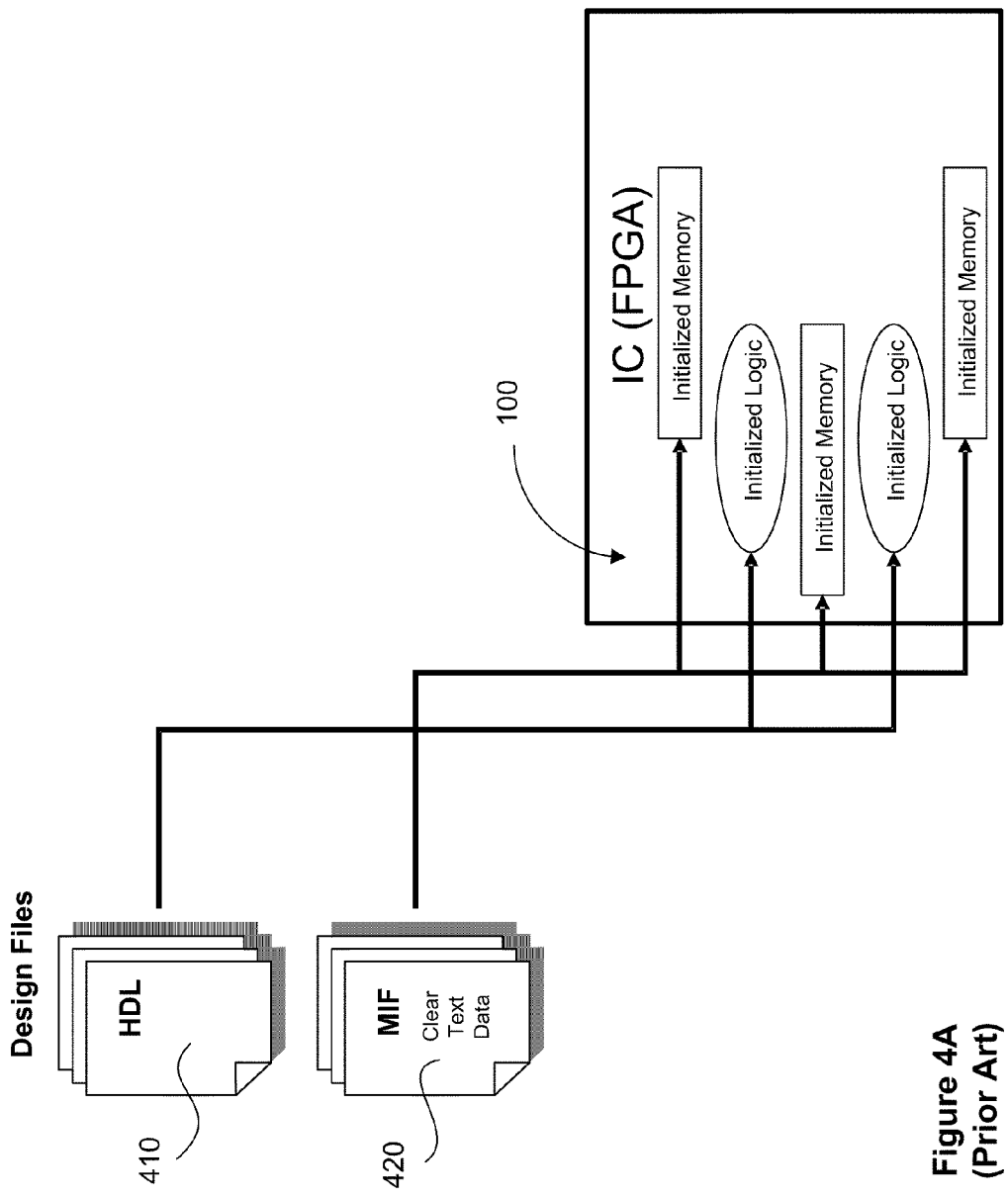
FIG. 4A illustrates a simplified configuration mapping of design and memory initialization files in the IC based on the design flow illustrated in FIG. 4.

FIG. 4A illustrates the configuration mapping performed by the configuration controller 100-A. As can be seen, the logic elements within the IC are configured with the required logic design specified in the HDL files 410, and the on-chip memories are initialized with the contents from the memory initialization files 420. The memory initialization data within the CBS is vulnerable to tampering by external elements during the programming of the configuration device, as illustrated by bubble 1 shown in FIG. 4, while in the configuration device and during the transmission from the configuration device to the configuration controller 100-A of the IC 100, as illustrated by bubble 2 shown in FIG. 4. It is, therefore, crucial to ensure that the memory initialization files are secured so that tampering or cloning of the memory initialization data may be prevented.

Figure 5:
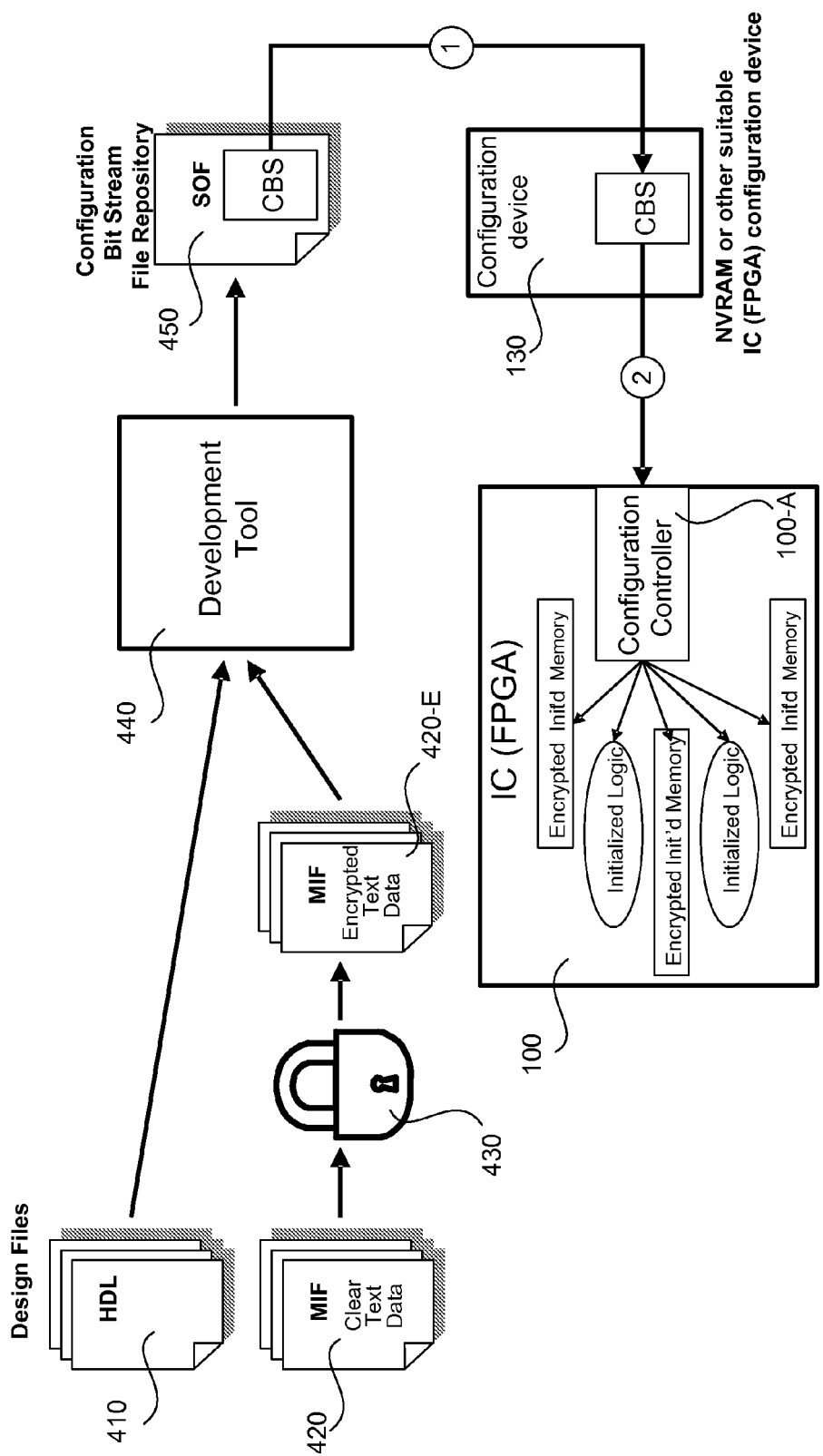
FIG. 5 illustrates a simple modified design flow for securing memory initialized data in an IC, in one embodiment of the invention.

FIG. 5 illustrates a simplified block diagram of a modified design flow that is used to secure memory contents of the IC. The process begins with a software program, executing on a PC or workstation, identifying one or more design files 410 and memory initialization files (MIFs) 420 that provide configuration information for the IC 100. The design files may include hardware description language files (HDLs), verilog files, and other related design configuration files used in configuring the IC 100. The memory initialization files (MIF) 420 include data patterns in clear text for initializing content of one or more memory elements within an on-chip memory of the IC 100. The software program is configured to validate and encrypt the identified MIFs 420 using one or more encryption algorithms 430 available at the PC or workstation and generate encrypted MIFs 420-E. The identified design files 410 and the encrypted MIFs 420-E are forwarded by the software program to a development tool 430 for assembling into a configuration bit stream. The development tool 430 is a software program, such as QUARTUS II™, available at the PC or workstation that assembles and compiles the design files 410 and encrypted MIFs 420-E to generate an executable configuration bit stream that is used in configuring the IC 100. The encryption algorithms 430 may include any one or combination of encryption algorithm and is not restricted to any one specific algorithm. The development tool 440 mentioned is exemplary and is not restrictive as any suitable EDA tool can be integrated with the embodiments described herein. The development tool 440 assembles the design files into a configuration bit stream of the form Static Random Access Memory (SRAM) Object File (.sof) and/or a Programmer Object File (.pof). The assembled configuration bit stream (CBS) is then stored in a storage repository 450, such as a SOF repository. The CBS is also programmed into a configuration device 130 that includes non-volatile memory, such as a non-volatile random access memory (NVRAM). During power-on of the IC 100, the IC 100 is configured using information from the CBS that is forwarded from the configuration device 130 to a configuration controller at the IC 100. The configuration controller decodes the CBS and initializes one or more logic elements of the IC 100. The information contained within the CBS defines the status and location of each bit within the IC 100. Thus, the logic elements within the IC 100 are configured by the configuration controller 100-A with the required logic design specified in the design files and the on-chip memories are initialized with the contents from the encrypted MIFs based on information contained in the CBS. In this embodiment, as the CBS includes encrypted MIF 420-E, the data related to the memory initialization file are masked so that the data patterns associated with the MIF are not easily recognizable within the CBS. The masking discourages cloning or tampering of the MIF during programming of the CBS into the configuration device 130 and during transmission from the configuration device 130 to the configuration controller 100-A in the IC 100, where the CBS is vulnerable. Further, as the content of the on-chip memory remains encrypted during the configuration phase, the memory initialization data is further safeguarded from tampering or cloning. Upon successful loading of the configuration information into the IC 100, the IC 100 transitions from the configuration mode into a user mode.

In the user mode, the initialized logic in the memory logic elements become active. The content within the memory logic elements are decrypted using a decryption and validation block (DVB) available at the IC 100. The workings of the DVB are explained in more detail with reference to FIGS. 7A and 7B. Essentially, the DVB decrypts and validates the contents within the logic elements of the on-chip memory. During the decryption and validation of the contents, the DVB suspends CPU operations within the IC 100 so that the contents of the memory will not be used. Upon successful decryption and validation, the DVB enables the CPU to start processing using the contents of the initialized on-chip memory of the IC 100.

Figure 6:
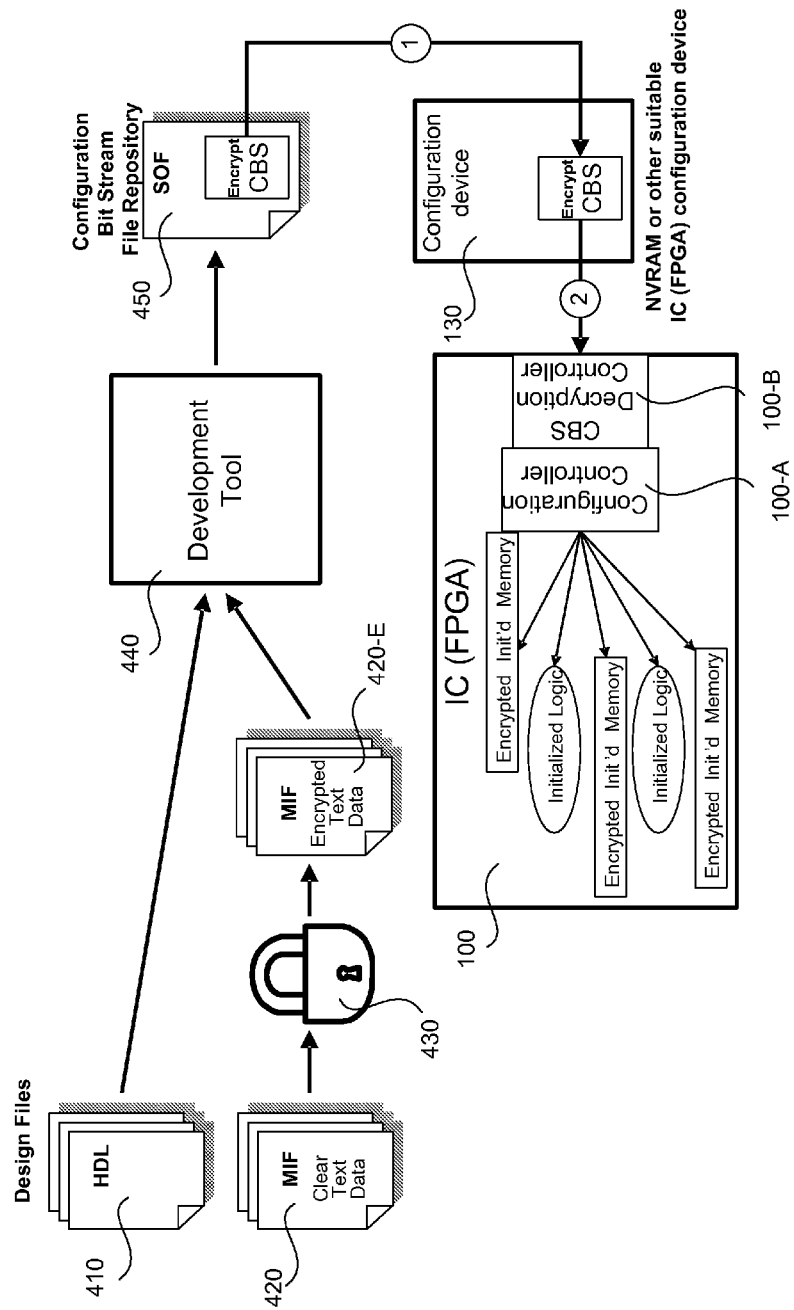
FIG. 6 illustrates a simple modified design flow for securing memory initialized data in an IC, in an alternate embodiment of the invention.

FIG. 6 illustrates an alternate embodiment of the invention depicted in FIG. 5. In this embodiment, aside from the MIFs 420 being encrypted, the assembled CBS is also encrypted making it harder to access the memory initialization data. As shown, the process begins with a software program, running on a PC or workstation, identifying one or more design files 410 and one or more memory initialization files (MIFs) 420 that are used to design and configure an IC. The MIFs 420 are encrypted using any one or combination of encryption algorithms 430 to generate encrypted MIFs 420-E. The encrypted MIFs 420-E and the design files 410 are forwarded to a development tool 440 for compiling and assembling. The development tool 440 validates, compiles and assembles the design files and encrypted MIFs to generate a CBS file. The generated CBS file is further encrypted based on instructions at the development tool 440. In one embodiment, the instructions to encrypt the CBS may be received from a user. In another embodiment, the instructions may be pre-defined within the development tool 440. In any case, the development tool uses any one or combination of encryption algorithms to encrypt the generated CBS file. The encrypted CBS file is forwarded to a CBS file repository 450. The encrypted CBS is also programmed into a non-volatile configuration device 130, such as a non-volatile memory. The configuration device 130 may include non-volatile random access memory (NVRAM), non-volatile Flash device, etc.

In the configuration phase, the encrypted CBS is transmitted from the configuration device 130 to the IC 100 through a CBS decryption controller 100-B within the IC 100. The decryption controller decrypts the encrypted CBS. It should be noted that the decryption controller only decrypts the encrypted CBS and not the contents of the encrypted memory initialization file within the CBS. The contents of the memory initialization files remain encrypted during the configuration phase. The decrypted CBS is forwarded to a configuration controller that decodes and loads the appropriate design related data into initialized logic elements and the contents from the encrypted memory initialized files into corresponding memory arrays within an on-chip memory of the IC 100. The memory arrays of the on-chip memory are initialized with the contents from the encrypted memory initialization files.

Upon successful loading of the contents from the CBS, the IC 100 leaves the configuration phase and transitions into a user phase. In the user phase, a decryption and validation block (DVB) within the IC 100 is used to decrypt and validate the memory initialization data loaded onto one or more memory arrays. The DVB may be a hardware logic block defined within the IC 100 that contains logic to decrypt and validate the contents of the memory arrays in the IC 100. In one embodiment, the DVB may be defined within a hardware initialized logic block shown in FIGS. 5, 5A, and 6. The purpose of validation is to ensure that the integrity of the memory content is not compromised. The DVB performs the decryption and validation by first signaling a processor within or external to the IC to hold-off processing on-chip memory contents. In one embodiment, the DVB is configured to throw the CPU in a reset mode. In another embodiment, the CPU is signaled to suspend all processing until the memory initialization and validation are complete. It should be understood by one skilled in the art that there are numerous ways to prevent the CPU from performing any processing using contents from on-chip memory. Upon putting the CPU in a reset mode or suspended from processing memory contents for the IC 100, the memory initialization data in the memory arrays of the IC 100 is decrypted and validated. Upon successful decryption and validation, the CPU is released from the reset mode or is enabled to start processing. The decrypted memory content is ready for use by a processor within or external to the IC 100.

Figure 7B:
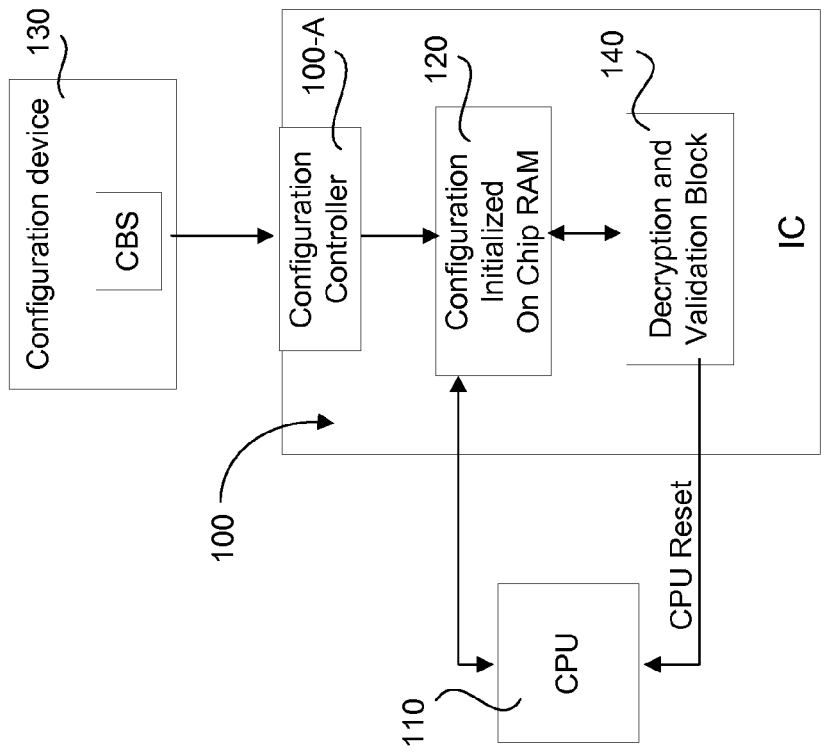
FIG. 7B illustrates a simplified block diagram of a CPU external to the IC that runs secure initialized code from an on-chip memory in user phase, in one embodiment of the present invention.
Figure 7A:
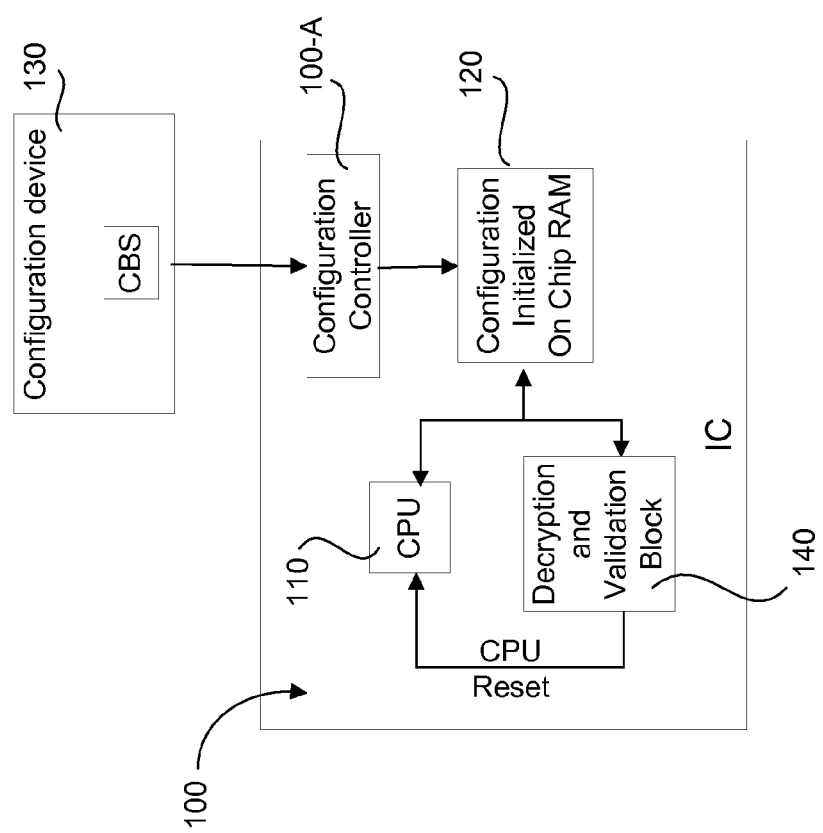
FIG. 7A illustrates a simplified block diagram of a CPU instantiated inside an IC that runs secure initialized code within an on-chip memory in user phase, in accordance with one embodiment of the present invention.

FIG. 7A illustrates a simplified block view of an IC 100 where the memory contents within the memory arrays of the on-chip memory are decrypted and validated, in one embodiment of the invention. As explained with respect to FIG. 5, a configuration device 130 receives the CBS from a development tool. The CBS is assembled using one or more design files, such as verilog or HDL files, and one or more memory initialization files (MIFs) that include configuration information for the IC 100. The MIFs are encrypted before being compiled into the CBS so that the data patterns are masked making the identification of memory initialization data within the CBS difficult. The MIFs are encrypted using any one or combination of encryption algorithms. The configuration bit stream is stored in a CBS File repository and programmed into the configuration device 130. In one embodiment, the development tool that compiles the design files and assembles the CBS file may encrypt the CBS file. In this embodiment, the configuration device 130 holds the encrypted CBS.

During a programming phase of the IC 100 that usually happens during a power-on phase, the CBS is transmitted to a configuration controller 100-A in the IC 100 through a data bus. In the case where the CBS is encrypted, the configuration device 130 transmits the encrypted CBS to a CBS decryption controller (not shown) in the IC 100 through a data bus. The decryption controller decrypts the CBS and then forwards the decrypted CBS to the configuration controller 100-A. The configuration controller 100-A loads the required logic design from the design files onto the logic elements and the encrypted memory initialization files onto the memory arrays within the IC 100. To facilitate loading of the design and configuration files, the configuration controller 100-A is communicatively connected to the on-chip memory and the on-chip memory is, in turn, communicatively connected to a processor (CPU) 110 and a decryption and validation block (DVB) 140 within the IC 100.

After loading the memory initialization data and logic design onto the IC 100, the IC 100 transitions from the configuration phase into the user phase. In the user phase, the decryption and validation block (DVB) 140 decrypts and validates the memory initialization data in the memory arrays in the on-chip memory 120. The DVB 140 is a hardware logic block that contains the logic to decrypt and validate the encrypted memory initialization data in the memory arrays. Two different hardware logic blocks, one for decryption logic and the other for validation logic, may be used to define the DVB, in one embodiment. The processor (CPU) 110 executes the code within the on-chip memory 120 using the data contained therein upon successful decryption and validation.

In one embodiment, to verify the integrity of the content of the MIFs, the validation logic includes a pre-defined validation sequence or result against which the decrypted MIFs are compared. If the sequence of MIFs agrees with the pre-defined validation sequence/result, then the contents of the MIFs received from the configuration device 130 is considered valid, otherwise, the content of the MIFs is considered invalid. The invalid MIFs may include additional bits or may lack some of the necessary bits.

In addition to the decryption logic and validation logic, the DVB 140 may include reset logic, in one embodiment of the invention. The reset logic is used by the DVB 140 to hold the CPU 110 in a reset mode, so as to prevent the CPU 110 from automatically executing code within the on-chip memory 120 while the memory initialization data is decrypted and validated. It should be understood that preventing the CPU from using the memory contents during decryption and validation may be done in any number of ways and using a reset mode is exemplary and should not be considered restrictive. Upon successful decryption and validation of the memory initialization data, the DVB 140 releases the CPU 110 from the reset mode so that the CPU 110 can execute the code in the on-chip memory using data contained therein.

If the decryption and validation of the memory initialization data is not successful, the reset logic within the DVB 140 includes error handling logic to handle the unsuccessful decryption and/or validation of the memory initialization data. In one embodiment, the error handling logic will continue to hold the CPU in reset mode while executing an error routine associated with the error. In another embodiment, the error handling logic will release the CPU from reset mode and an error routine is executed. In this embodiment, the error routine may include exiting the process so that the released CPU 110 is prevented from accessing the contents in the on-chip memory 120.

FIG. 7B illustrates an alternate embodiment of the invention described with reference to FIG. 7A. In this embodiment, an external CPU 110 accesses the contents in an on-chip memory 120 of the IC 100. The IC 100 includes a decryption and validation block 140 to decrypt and validate memory initialization data loaded into the memory arrays of the on-chip memory 120 from a CBS received from a configuration device 130. In this embodiment, the DVB 140 holds the external CPU 110 in a reset mode, then decrypts and validates the memory initialization data within the memory arrays of the on-chip memory. The reset mode prevents the external CPU 110 from automatically executing code within the on-chip memory using data available therein. As mentioned earlier with respect to FIG. 7A, the reset mode is one way of preventing the CPU from accessing the memory contents in the on-chip memory during decryption and validation and should be considered exemplary and not restrictive. Other ways of preventing the CPU from accessing the memory contents in the on-chip memory may be employed. Further, if the memory initialization data within the memory arrays of the on-chip memory was indeed tampered, the reset mode will prevent the external CPU 110 from processing the tampered contents of the on-chip memory. Thus, validating the memory initialization data within the memory arrays in the user mode ensures that the CPU runs with the memory initialization data that is not compromised. Upon successful decryption and validation, the DVB 140 releases the reset mode on the external CPU 110 so that the external CPU 110 can start executing and use the contents of the on-chip memory.

Figure 8:
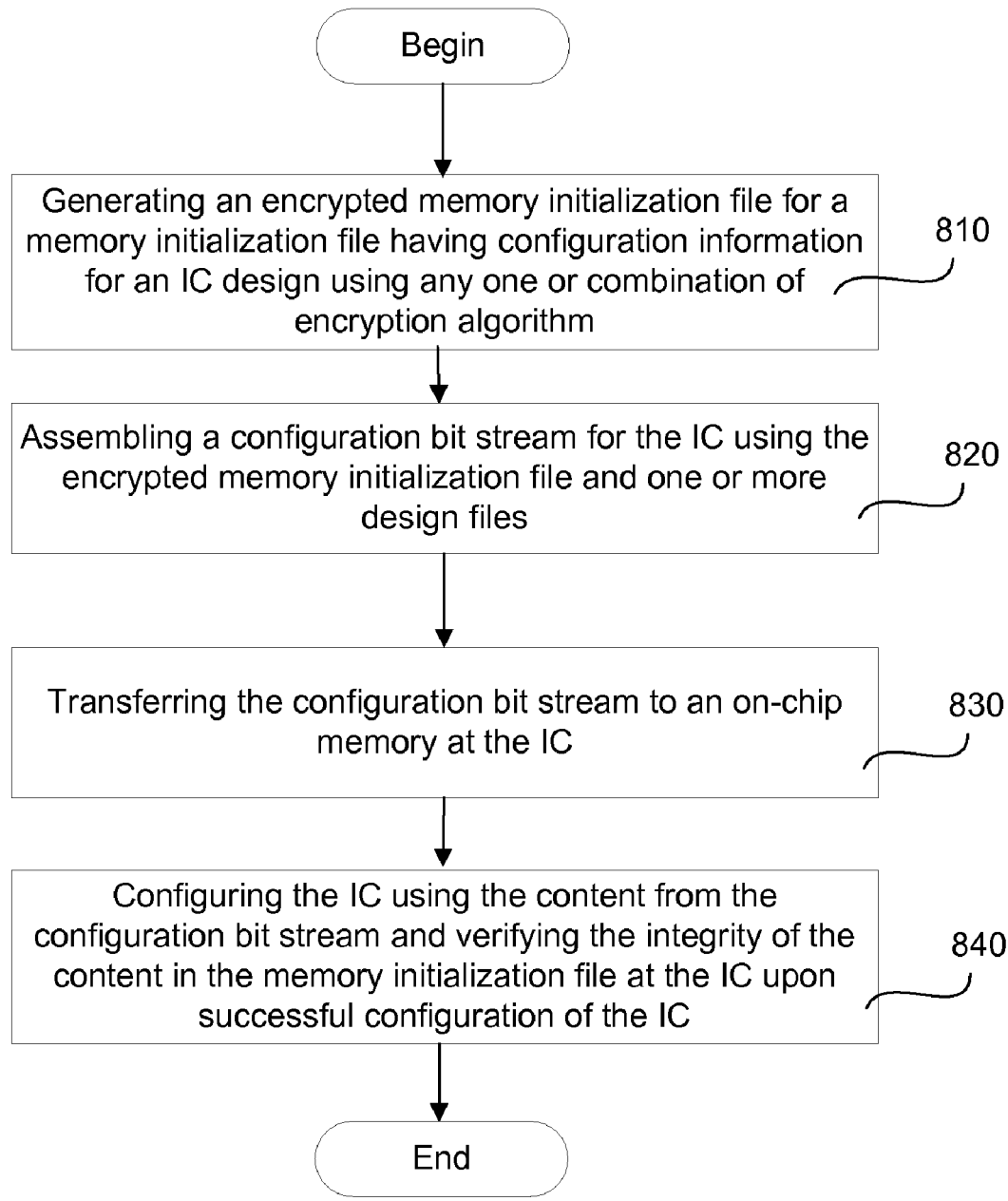
FIG. 8 illustrates a flow chart of operations involved in securing data within memory of an IC, in accordance with one embodiment of the present invention.

With the above general understanding, a method for securing the contents of an on-chip memory of an IC will now be described with reference to FIG. 8. FIG. 8 details the process operations involved in securing the contents of the on-chip memory. The process begins at operation 810 wherein one or more design files and one or more memory initialization files (MIFs) that contain the configuration information of the IC are identified. The MIFs are encrypted to generate corresponding encrypted memory initialization files. The design files and encrypted MIFs are forwarded to a development tool to compile and assemble into a configuration bit stream (CBS), as illustrated in operation 820. The CBS is stored in a non-volatile memory configuration device. During the configuration phase of the IC, the CBS from the configuration device is transmitted to the IC, as illustrated in operation 830. A configuration controller receives the CBS from the configuration device, decodes and loads the contents into corresponding logic elements and memory arrays in the on-chip memory of the IC. The process concludes with decryption and validation of the contents in the memory array, as illustrated in operation 840.

The decryption, validation and initialization of the IC are performed in the following manner. The IC enters a user phase from a configuration phase upon loading the contents of the CBS into corresponding logic elements and memory arrays. A DVB at the IC holds a central processing unit (CPU) within or external to the IC in reset mode using a reset logic. Upon holding the CPU in reset mode, the memory initialization data within the one or more memory arrays is decrypted and validated by the DVB at the IC. As mentioned earlier, the DVB includes a logic element that includes a decryption logic corresponding to the one or more encryption logic used in encrypting the memory initialization data, to decrypt the memory initialization data and a logic element that defines a validation logic for validating the decrypted memory initialization data. In one embodiment, these logic elements are defined within the user design of the IC. Upon successful decryption and validation, the DVB releases the CPU from the reset mode so that the CPU may execute and use the contents of the on-chip memory. If any one or both of the decryption and validation operation are unsuccessful, then the DVB includes error handling logic to deal with the unsuccessful decryption and/or validation operation. The CPU, in this instance may continue to be held in reset mode or may be released from reset but prevented from using the content of the on-chip memory till the error is resolved.

By using hardware logic elements within the IC to decrypt the encrypted memory initialization file, snooping and tampering of the memory initialization file is prevented. By keeping the logic elements and decrypting and validating the memory initialization data local to the IC, the embodiments of the invention provide an anti-tamper environment that prevents inspection and unauthorized modification from external elements. The embodiments, described herein may be employed with any integrated circuit, such as processors and programmable logic devices (PLDs). Exemplary PLDs include but are not limited to a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the any of the PLDs owned by the assignee.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for securing memory initialization data within an on-chip memory of an integrated circuit (IC), comprising:
    encrypting a memory initialization file associated with the IC through an encryption algorithm to generate an encrypted memory initialization file, wherein the memory initialization file comprises data patterns for initializing content within the on-chip memory of the IC;
    assembling a configuration bit stream for designing the IC with the encrypted memory initialization file and at least one design file;
    configuring an IC according to the configuration bit stream; and
    verifying integrity of the encrypted memory initialization file at the IC in response to successfully configuring the IC, wherein a processor within the IC is maintained in reset mode during said verifying, wherein the reset mode prevents the processor from executing content within the on-chip memory.

2. The method of claim 1, wherein verification of integrity of the encrypted memory initialization file is performed at the IC in response to the IC transition to a user phase.

3. The method of claim 1, wherein the configuration bit stream is stored in a configuration device with non-volatile memory external to the IC prior to configuring of the IC.

4. The method of claim 1, wherein configuring the IC with the configuration bit stream further comprises:
receiving the configuration bit stream from a configuration device that is external to said IC;
decoding the configuration bit stream to identify the logic design and content of the memory initialization file; and
loading the logic design into one or more logic elements of the IC and initializing one or more memory arrays using content from the memory initialization file,
wherein the memory arrays are loaded with content from encrypted memory initialization file.

5. The method of claim 4, wherein the decoding and the loading are performed in response to the IC being in a configuration phase.

6. The method of claim 1, wherein the verifying comprises:
decrypting the encrypted memory initialization file in the on-chip memory of the IC using an available decryption logic of the IC; and
validating the content within the decrypted memory initialization file using an available validation logic of the IC to ensure integrity of the content of the memory initialization file at the IC.

7. The method of claim 6 further comprises:
releasing the reset mode of the processor in response to successful decryption and validation of the encrypted memory initialization file wherein the releasing enables the processor to execute code within the on-chip memory.

8. The method of claim 6 further comprises:
performing error handling in response to unsuccessful decryption; and
performing error handling in response to unsuccessful validation of the encrypted configuration bit stream, wherein the error handling comprises logic to handle the reset mode of the processor.

9. The method of claim 1 further comprises: encrypting the configuration bit stream through an encryption algorithm that is distinct from the encryption algorithm used in generating the encrypted memory initialization file.

10. An integrated circuit (IC), comprising,
an on-chip memory with one or more memory arrays to store a configuration bit stream, wherein said configuration bit stream is generated external to said IC, said configuration bit stream comprises a compilation of a design file and an encrypted memory initialization file, the encrypted memory initialization file is an encrypted version of a memory initialization file associated with the IC, the encrypted memory initialization file comprises data patterns for initializing content within the on-chip memory of the IC;
a decryption and validation block (DVB) including a decryption logic and a validation logic to decrypt and validate the encrypted memory initialization file; and
a processor to execute code contained within the on-chip memory using the content from the encrypted memory initialization file contained therein,
wherein the processor, the DVB and the on-chip memory of the IC are communicatively connected through a data bus and wherein the DVB further includes reset logic to maintain the processor in the IC in reset mode during decryption and validation of encrypted memory initialization file.

11. The IC of claim 10, wherein the decryption logic and the validation logic of the DVB are provided as hardware logic elements in the IC, the decryption logic including a decryption key associated with the encryption algorithm used in the encryption of memory initialization file, the validation logic including a pre-defined validation sequence used for validating content of the memory initialization file.

12. The IC of claim 10, further comprises:
a configuration device with non-volatile memory external to the IC for storing the configuration bit stream comprising the encrypted memory initialization file used in initializing the on-chip memory of the IC.

13. The IC of claim 10, wherein the DVB further comprises:
release logic to release the processor from the reset mode upon successful decryption and validation.

14. The IC of claim 10, wherein the DVB further comprises:
error handling logic to handle errors encountered at the IC during decryption and validation of the encrypted memory initialization file.

15. The IC of claim 10, wherein the processor is external to the IC, the external processor and the on-chip memory of the IC communicatively connected by a bus to enable the external processor to access content within the on-chip memory.

16. The IC of claim 10, wherein the IC is a Digital Signal Processing device.

17. A method for securing memory initialization data within an on-chip memory of an integrated circuit (IC), comprising:
receiving an encrypted memory initialization file at a development tool external to an IC, the encrypted memory initialization file resulting from encrypting a memory initialization file associated with the IC through one or more encryption algorithms, the memory initialization file comprising configuration information for the on-chip memory of the IC;
assembling the encrypted memory initialization file with one or more design files into a configuration bit stream, the design files comprising design logic for designing the IC;
encrypting the assembled configuration bit stream through one or more encryption algorithms available to the development tool, the one or more encryption algorithms used in encrypting the configuration bit stream being distinct from the one or more encryption algorithms used in encrypting the memory initialization file;
configuring the IC using the encrypted configuration bit stream; and
verifying integrity of the content within the encrypted memory initialization file at the IC in response to successfully configuring the IC.

18. The method of claim 17, wherein configuring the IC using the encrypted configuration bit stream further comprises:
receiving the encrypted configuration bit stream at the IC from the development tool through a configuration device, wherein the encrypted configuration bit stream programmed into a non-volatile memory within the configuration device;
decrypting the encrypted configuration bit stream using a decryption algorithm corresponding to the encryption algorithm used in encrypting the configuration bit stream;
decoding the decrypted configuration bit stream to identify user design logic and content of the encrypted memory initialization file contained therein; and configuring one or more logic elements within the IC with the user design logic and initializing one or more memory arrays with the content from the encrypted memory initialization file.

19. The method of claim 18, wherein the configuring one or more logic elements and the initializing of one or more memory arrays are performed during the configuration phase of the IC.

20. The method of claim 18, wherein the verifying further comprises:
   decrypting the content within the one or more memory arrays at the on-chip memory of the IC using an available decryption logic of the IC; and
   validating the decrypted content within the memory arrays using an available validation logic of the IC, wherein the decryption and validation at the on-chip memory performed at the IC in response to the IC entering a user phase.

21. The method of claim 20 further comprises:
   maintaining a processor at the IC in reset mode during the verifying, wherein the reset mode prevents the processor from executing contents within the on-chip memory.

22. The method of claim 20 further comprises:
   releasing the processor from the reset mode in response to successful decryption and validation of the content of the memory initialization file;
   performing error handling in response to unsuccessful decryption of the content of the memory initialization file; and
   performing error handling in response to unsuccessful validation of the content of the memory initialization file,
   wherein the error handling comprises logic to handle the reset mode of the processor.

* * * * *